Figure 6:
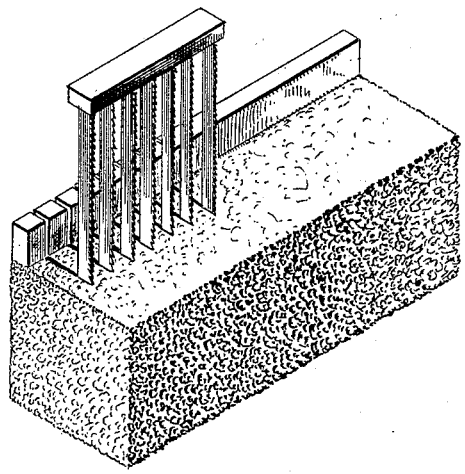

(No Model.) 3 Sheets—Sheet 1.
C. H. THOMPSON.
METHOD OF MAKING ELECTRODES FOR SECONDARY BATTERIES.
No. 392,573. Patented Nov. 6, 1888.
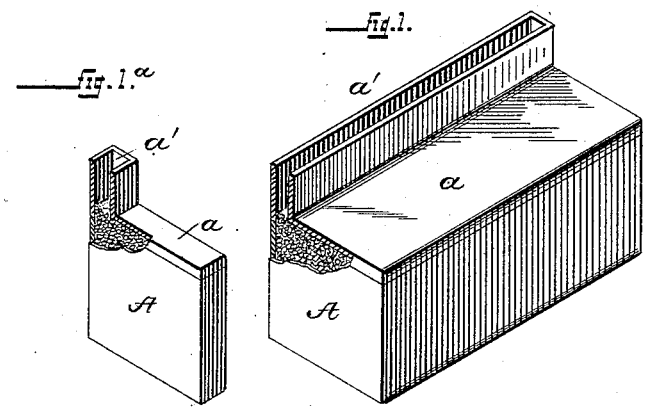
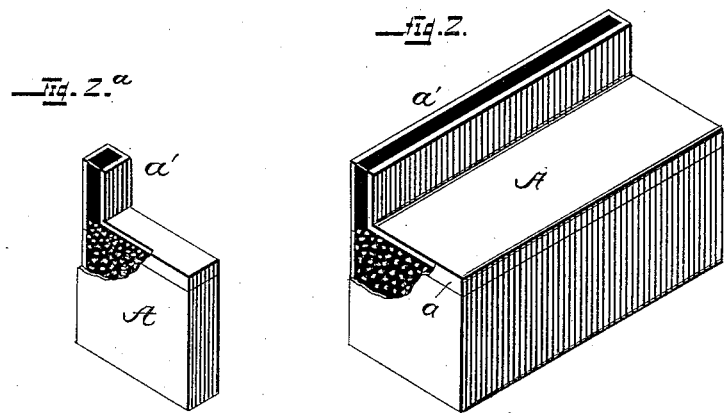
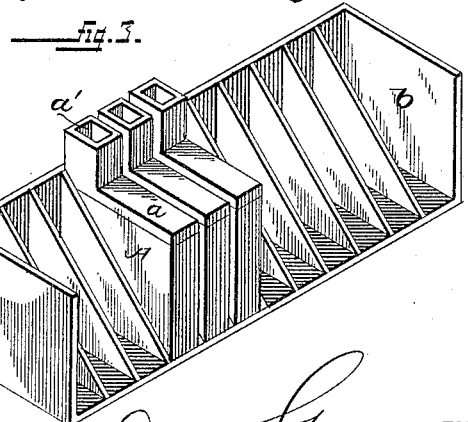
Witnesses:
Inventor:
Charles H. Thompson,
by R. S. Dyrenforth,
his Attorney.

(No Model.) 3 Sheets—Sheet 2.
C. H. THOMPSON.
METHOD OF MAKING ELECTRODES FOR SECONDARY BATTERIES.
No. 392,573. Patented Nov. 6, 1888.
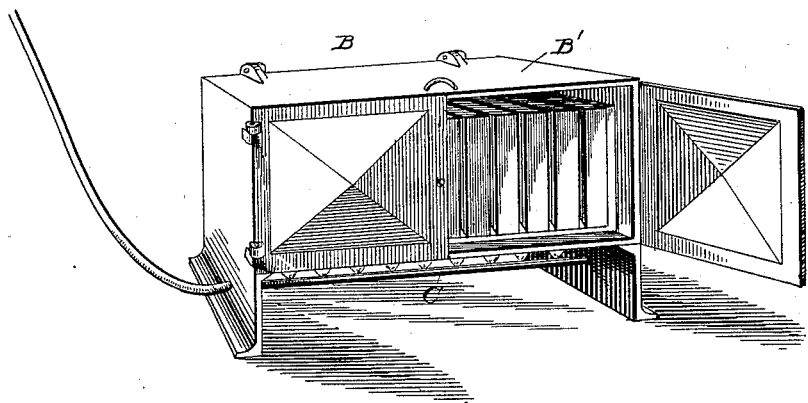
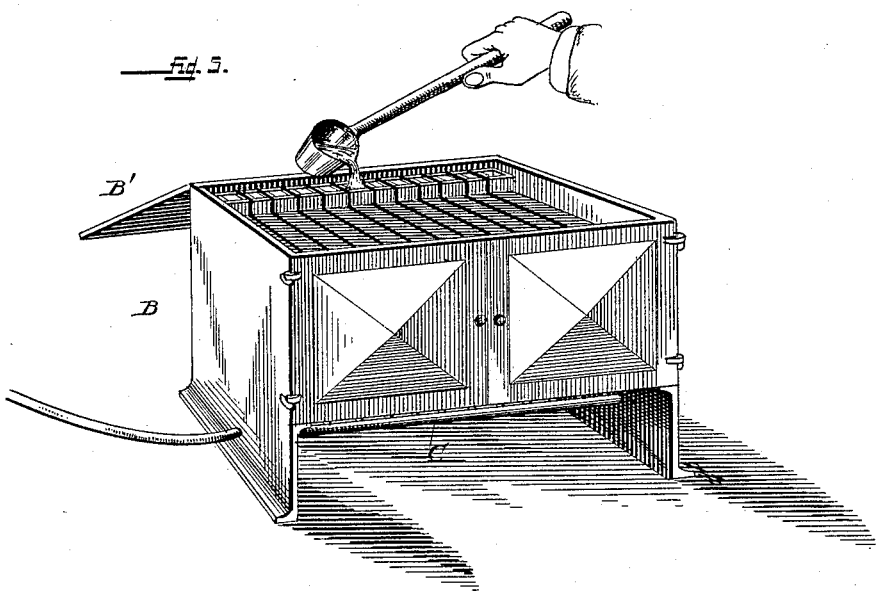

(No Model.) 3 Sheets—Sheet 3.

C. H. THOMPSON.
METHOD OF MAKING ELECTRODES FOR SECONDARY BATTERIES.

No. 392,573. Patented Nov. 6, 1888.

Witnesses:

Inventor:
Charles H. Thompson,
his Attorney.

UNITED STATES PATENT OFFICE.

CHARLES H. THOMPSON, OF DETROIT, MICHIGAN, ASSIGNOR TO THE WOODWARD ELECTRICAL COMPANY, OF SAME PLACE.

METHOD OF MAKING ELECTRODES FOR SECONDARY BATTERIES.

SPECIFICATION forming part of Letters Patent No. 392,573, dated November 6, 1888.

Application filed March 9, 1888. Serial No. 266,705. (No model.)

*To all whom it may concern:*

Be it known that I, CHARLES H. THOMPSON, a citizen of the United States, residing at Detroit, in the county of Wayne and State of Michigan, have invented certain new and useful Improvements in Methods of Making Electrodes for Secondary Batteries; and I do hereby declare the following to be a full, clear, and exact description of the invention, such as will enable others skilled in the art to which it appertains to make and use the same.

This invention relates to electrodes for secondary batteries.

The object is, in a ready and practicable manner, to produce a support for an electrode for a secondary battery which shall present large surface exposure, which shall be of such construction as to hold firmly the active material placed upon it and prevent its scaling or falling off, and which shall be of the highest efficiency and durability in use; finally, to produce a practical, efficient, and comparatively inexpensive electrode.

With these objects in view the invention consists in producing a support for an electrode for a secondary battery by casting or molding a suitable metallic substance in contact with a body or mass of such nature that the metal in casting will penetrate the body or mass, the mold being heated to keep the metallic substance fluent for the purpose, and the body or mass afterward to be removed, leaving the metallic substance in a highly porous condition throughout, with cells communicating one with another and with tortuous ducts throughout; furthermore, in producing a suitable support by casting or molding a suitable metallic substance in contact with a body or mass of such nature that the substance in casting or molding will penetrate the body or mass, the body or mass afterward to be removed, and either before or after such removal the substance to be cut or sawed into slabs or plates of suitable size; furthermore, in producing a suitable support, with a proper projection to serve as a terminal for electrical connection, by casting the support in cellular condition and at the same time casting a solid projection integral therewith, and, finally, in producing an efficient electrode.

In the accompanying drawings, presenting part of this specification, are illustrated successive constructions of my support, though the same may be somewhat varied without departing from the spirit of my invention.

Figure 7:
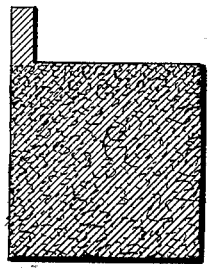
Figure 8:
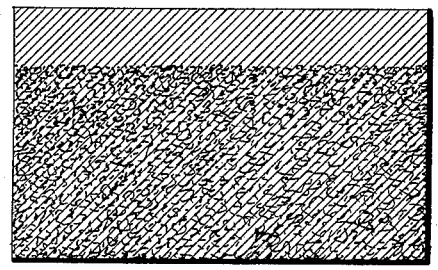
Figure 9:
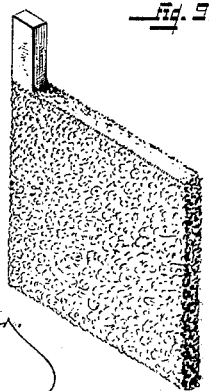

In the drawings, Figures 1 and $1^a$ are perspective views of suitable molds in which to cast my support, one side being broken away toward the upper part to show the penetrable body or mass within to render the casting porous. Figs. 2 and $2^a$ are similar views of suitable molds in which to cast my support, a portion of the upper part of the mold and of the sprue being broken away to show the manner by which the body of the electrode is cast porous and the projection solid, the two being joined. Fig. 3 is a perspective view of a rack containing molds to be heated. Fig. 4 is a similar view of a metallic box or oven, being heated by gas-flame and containing a rack of molds, one side of the oven being left open to show the molds within. Fig. 5 is an isometrical projection of an oven containing the heated molds in process of filling, the top of the oven having been removed for the purpose. Fig. 6 is a perspective view showing a manner of making the supports into slabs when the metal has been cast in a large body. Fig. 7 is a view in cross-section of the body of my support for an electrode, showing its porous or cellular condition after removal of the penetrable mass into which it was cast. Fig. 8 is a view in longitudinal section of the entire support with the projection, showing the support porous, the projection solid, and the two integral. Fig. 9 is a perspective view of an electrode, being my peculiarly-produced support entire, packed with suitable material to make an electrode, and showing the solid terminal.

Heretofore porous metallic supports for electrodes for batteries have been made by casting a suitable metal upon a layer of rock-salt and rosin, then supplying another layer of rock-salt and rosin over the metal, and then proceeding as before, and so on; but in no case, so far as I am aware, has a support for an electrode for a battery been cast complete in porous or cellular condition at a single operation; nor has a cellular mass of metal been cast and subsequently cut or sawed up into plates; nor has a support porous throughout been cast complete at a single operation with a solid metallic projection, integral with the porous body and suitable to present the desired terminal when the support is converted into an electrode.

To carry my invention into effect I first fill a suitable mold with any highly-refractory penetrable mass which can afterward be removed from the casting made, and pour into the mold so provided a suitable metal for an electrode. The mass which I prefer to employ in the mold is rock-salt, since this, while being refractory and thus not destructible by the molten metal, is readily removable from the casting afterward by water, the water readily dissolving it out. The mold may be of size and shape requisite to give a support at once of the exact size and shape desired; or it may be larger, and the resulting casting be sawed or otherwise divided into plates of the desired size and shape. Thus the mold may be eight inches by two and one-half feet in length.

For an electrode for a primary battery I prefer to make the casting of zinc. For a secondary battery I prefer to make the casting of lead.

To insure the running of the molten metal through the entire body of the mass in the mold and to all parts of the mold, it is best to have the mass hot while the metal is running into the mold. This may be done by charging the mold with the mass in a heated condition and pouring in the metallic substance before it cools, or by heating the mold; and the mold may be heated in any suitable way, as by laying it upon a stove, placing it in an oven, subjecting it to the action of flame or that of slaking lime, placing it in a sand bath, or otherwise, while the molds may be held in a suitable rack while heating and while the casting is in progress.

Although the body of the support is rendered porous by the presence during casting of the mass into and about which the metal penetrates, I provide for a solid projection from this porous mass by having a neck, sprue, or spout of appropriate size and leaving this free. The projections so produced supply the requisite terminal when the casting made becomes an electrode.

My specific procedure is as follows: I cast the support complete in a single operation, and accomplish this by using an inclosed mold or flask, from one corner of which extends a filling spout or sprue, the length and size of which is that of the required projection or terminal, the mold being filled with broken rock-salt or other soluble crystalline mass, and the temperature of the whole being brought up to a degree a little above the melting-point of lead and molten lead being poured into the mold. Owing to the heat of the mold and contents, the lead is kept fluent until it fills all the interstices between the crystals, as well as the neck or sprue, which, not being filled with crystals, of course leaves a solid lead body protruding from one corner or edge of the cellular structure cast within the mold itself. I then dissolve out the salt or crystal employed by the use of the proper solvent, and the result is a completed support ready to be filled with oxide of lead or other active material or element used in a secondary battery by rendering the active material plastic and introducing it into the cells and ducts under proper pressure to insure a complete filling, if complete filling be desired. I intend filling these cellular supports by placing them in a proper seat or recess in the base of the filling apparatus and under a receptacle containing the plastic material against the bottom of the receptacle, the seat containing the cellular support being securely held, and above the plastic material there being a plunger or piston actuated by hydraulic or other power, which by direct pressure forces the plastic material into every cell and cavity and in a compact state, the result being a composite structure for an electrode ready for forming in the usual way by action of the dynamo.

For primary batteries, where a very large surface exposure is desirable, as for rapid work, I cast zinc in the manner above described, and thus produce a zinc electrode with many times the usual surface presented to the acid, with consequently rapid decomposition and an increased current.

Referring to the drawings, A designates a mold constructed of any material that will withstand heat, the interior of which is filled with any highly-refractory mass, but preferably in this instance with rock-salt.

$a$ designates the lid or cover of the mold, provided with a filling-spout or sprue, $a'$, extending its entire length, in order that a solid continuous ridge or projection for a terminal may be cast integral with the substance to be filled into the mold, subsequently to present a support for an electrode.

B designates a metallic box or oven, in which are placed a number of racks, $b$, employed to contain molds filled with the refractory mass when these are narrow.

C designates a row of gas-jets extending under the oven, and so arranged that their flames will impinge against the entire bottom thereof in order to insure equal heating of all the molds within.

When the refractory mass in the molds has reached a temperature at or slightly above the melting-point of the metal to be cast, the lid or cover B' is removed, and the molten metal is then poured into the spout or sprue $a'$ until the interior is filled, as well as this spout or sprue. Owing to the heat of the rock-salt, the lead will remain fluent until it has penetrated every portion of the mold. As there is no rock-salt in the spout, that part alone of the resulting casting will be of solid substance cast. After the metal has cooled the rock-salt is dissolved out, and the cellular structure remaining is either in the immediate condition or shape desired, or, if in a large block, will be sawed or otherwise divided into the desired size and shape to present a support for an electrode. The resulting support is then coated with active material, or the active material is forced into the pores by pressure, and the hole is then formed in the usual manner.

The article produced by the herein-described method is not here claimed, the same forming the subject-matter of an application for patent filed of even date herewith, Serial No. 266,707.

Having thus fully described my invention, what I claim as new, and desire to secure by Letters Patent, is—

1. The method of producing a support for an electrode for a secondary battery, which consists in molding a suitable metallic substance in contact with a body or mass under heat, and of such nature that the metal in casting will penetrate the body or mass, afterward to be removed, leaving the metallic substance in a highly porous condition throughout, with cells communicating one with another, forming tortuous ducts throughout, excluding the body or mass from a portion of the mold, whereby a part of the metallic substance will be cast solid and a solid terminal will be formed integral with the porous metal, substantially as described.

2. The method of producing an electrode for a secondary battery, which consists in casting or molding a highly porous or cellular support with a solid terminal integral with the body thereof, then coating the support with active material or pressing it into the pores or cells thereof, substantially as described.

3. The method of producing a suitable support by casting or molding a suitable metallic substance in contact with a body or mass of such nature that the substance in casting or molding will penetrate the body or mass, the body or mass afterward to be removed, and either before or after such removal the substance to be divided or sawed into slabs or plates of suitable size, substantially as shown and described.

In testimony whereof I affix my signature in presence of two witnesses.

CHARLES H. THOMPSON.

Witnesses:
R. G. DYRENFORTH,
W. W. MORTIMER.